US009948525B2

(12) United States Patent
Stark et al.

(10) Patent No.: US 9,948,525 B2
(45) Date of Patent: Apr. 17, 2018

(54) STORAGE UNIT PRIORITY BASED ON CONFIGURATION INFORMATION

(71) Applicant: HEWLETT PACKARD ENTERPRISE DEVELOPMENT LP, Houston, TX (US)

(72) Inventors: David Stark, Colorado Springs, CO (US); Siamak Nazari, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 27 days.

(21) Appl. No.: 14/444,742

(22) Filed: Jul. 28, 2014

(65) Prior Publication Data

US 2016/0028582 A1  Jan. 28, 2016

(51) Int. Cl.
*H04L 12/24* (2006.01)
*H04L 12/911* (2013.01)
*G06F 3/06* (2006.01)

(52) U.S. Cl.
CPC ............ *H04L 41/5022* (2013.01); *G06F 3/06* (2013.01)

(58) Field of Classification Search
CPC . H04L 41/0803; H04L 41/5022; H04L 47/70; G06F 3/06
USPC .................................................. 709/214, 215
See application file for complete search history.

(56) References Cited

U.S. PATENT DOCUMENTS

| | | | |
|---|---|---|---|
| 6,058,494 A | 5/2000 | Gold et al. | |
| 6,515,964 B1 * | 2/2003 | Cheung | H04L 12/66 370/230 |
| 6,763,392 B1 * | 7/2004 | del Val | H04L 47/724 709/231 |
| 7,263,596 B1 * | 8/2007 | Wideman | G06F 3/0608 709/215 |
| 7,668,177 B1 * | 2/2010 | Trapp | H04L 12/40032 370/395.42 |
| 8,046,769 B2 * | 10/2011 | Masuda | G06F 11/3409 702/182 |
| 8,285,952 B2 | 10/2012 | Arakawa et al. | |
| 8,732,518 B2 | 5/2014 | Storer et al. | |
| 8,862,952 B1 * | 10/2014 | Booth | G11C 16/3468 711/103 |
| 9,712,401 B2 * | 7/2017 | Wright | H04L 41/5022 |
| 2007/0050588 A1 * | 3/2007 | Tabata | G06F 3/0608 711/165 |

(Continued)

OTHER PUBLICATIONS

EMC® NetWorker® Release 7.6 Service Pack 3, (Research Paper), Dec. 30, 2011, 814 pps. http://oregonstate.edu/net/services/backups/clients/7_6/nw7_6sp3admin.pdf.

(Continued)

*Primary Examiner* — Kostas Katsikis
(74) *Attorney, Agent, or Firm* — Hewlett Packard Enterprise Patent Department

(57) ABSTRACT

Storage unit priority based on configuration information may be determined, for example, by a processor analyzing configuration information associated with the storage units to create a priority order associated with the storage units. The configuration information associated with each storage unit may be standardized for comparison to the configuration information associated with the other storage units. The processor may perform an action related to the storage units according to the priority order.

20 Claims, 4 Drawing Sheets

(56) References Cited

U.S. PATENT DOCUMENTS

| | | | | |
|---|---|---|---|---|
| 2008/0219176 | A1* | 9/2008 | Yamada | H04L 47/10 370/252 |
| 2009/0172460 | A1 | 7/2009 | Bobak et al. | |
| 2010/0205371 | A1* | 8/2010 | Tanaka | G06F 3/0605 711/114 |
| 2011/0238775 | A1* | 9/2011 | Wu | G06F 17/30233 709/213 |
| 2012/0266011 | A1* | 10/2012 | Storer | G06F 11/008 714/1 |
| 2013/0290775 | A1 | 10/2013 | Tucek et al. | |
| 2014/0196037 | A1* | 7/2014 | Gopalan | G06F 9/4856 718/1 |
| 2015/0169406 | A1* | 6/2015 | Li | G06F 11/1012 714/763 |
| 2015/0236926 | A1* | 8/2015 | Wright | H04L 41/5022 709/224 |

OTHER PUBLICATIONS

Wikipedia, "Dynamic priority scheduling," Jun. 22, 2013, <https://en.wikipedia.org/w/index.php?title=Dynamic_priority_scheduling&oldid=56 01261.

Wikipedia, "Imputation (Statistics)," (Web Page), Jul. 17, 2014, 4 pages, available at https://en.wikipedia.org/w/index.php?title=Imputation_(statistics)&oldid=617314923.

Wikipedia, "Missing Data," (Web Page), May 24, 2014, 5 pages, available at https://en.wikipedia.org/w/index.php?title=Missing_data&oldid=609929475.

Wikipedia, "Quality of service," Jul. 1, 2014, <https://en.wikipedia.org/w/index.php?title=Quality_of_service&oldid=615156928>.

Wikipedia, "Scheduling (computing)," Jul. 16, 2014, <https://en.wikipedia.org/w/index.php?title=Scheduling_(computing)&oldid=617115950>.

* cited by examiner

300

STORAGE UNIT 1 CONFIGURATION PARAMETER A – 2

SYSTEM STORAGE UNIT CONFIGURATION PARAMETER A MEAN – 5

SYSTEM STORAGE UNIT CONFIGURATION PARAMETER A DEVIATION - 2

301

STORAGE UNIT 1 CONFIGURATION PARAMETER A
PRIORITY VALUE (2-5)/2 = -1.5

302

STORAGE UNIT CONFIGURATION
PARAMETER A PRIORITY VALUE

STORAGE UNIT 1 – -1.5
STORAGE UNIT 2 – 0.5
STORAGE UNIT 3 – -0.5
STORAGE UNIT 4 – 1.5

303

PRIORITY LIST

STORAGE UNIT 4
STORAGE UNIT 2
STORAGE UNIT 3
STORAGE UNIT 1

FIG. 3

STORAGE UNIT PRIORITY BASED ON CONFIGURATION INFORMATION

BACKGROUND

A storage system may include physical storage space mapped to virtual volumes that are visible to hosts. For example, an identifier associated with a virtual volume, such as a logical unit number, may be visible to a host. Information about the physical storage space may be hidden from the host such that the host uses the identifier to store and receive information. A user may configure the virtual volumes by providing user input through a user interface, and the provided configuration information may dictate how the virtual volumes are used within the storage system.

BRIEF SUMMARY

Not Applicable.

BRIEF DESCRIPTION OF THE DRAWINGS

The drawings describe example embodiments. The following detailed description references the drawings, wherein:

FIG. 3 is a block diagram illustrating one example of standardizing a configuration parameter to indicate the relative value of the parameter within a storage system.

DETAILED DESCRIPTION

In one implementation, a storage system includes a processor in control of multiple virtualized storage units, such as virtual storage volumes, and the processor analyzes configuration information associated with the storage units to create a priority order associated with the storage units. For example, the processor may perform an action related to the storage units according to the priority order. Using configuration information allows a priority to be inferred absent of expressly having a separate administratively set parameter indicating priority. In addition, changes in configuration may be taken into account to determine updated priority information without causing an extra input burden on a user. Additionally, information such as host usage information may be factored into the priority determination.

Using configuration information may result in not all parameters being set. For example, the configuration information may be set for some storage units or sets of storage units and not for others. The processor may adjust or standardize the configuration information associated with each storage unit, so as to take into account how it compares with the configuration information associated with the other storage units, in order to make different and differently scaled configuration metrics comparable with one another.

Prioritizing how storage units are treated relative to one another based on inferred priority allows for actions to be performed in a manner that improves data accessibility. Creating a storage unit priority list based on configuration information (and in some implementations, additionally usage information) may have useful applications. For example, when a failure occurs, the storage units may be recovered in order of the priority list. In the event of power loss, upon recovery, the storage units may be presented to hosts in order of the priority list. In some cases, a storage system may have a method for re-balancing logical disks and virtual volumes. The storage system may use the priority list to determine which storage units should take advantage of newly added nodes to the storage system.

Figure 1:
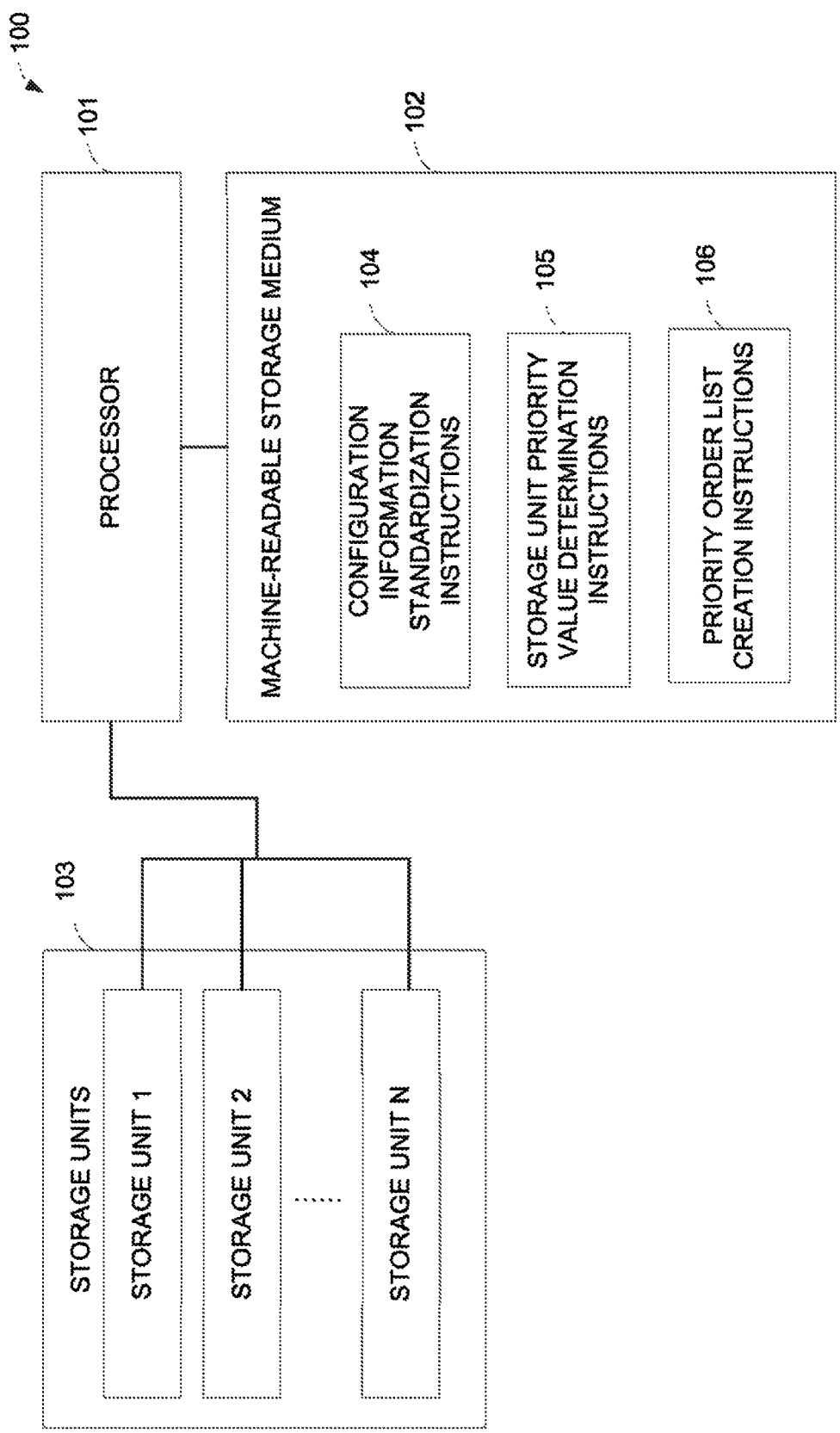
FIG. 1 is a block diagram illustrating one example of a storage system to determine storage unit priority based on configuration information.

FIG. 1 is a block diagram illustrating one example of a storage system 100 to determine storage unit recovery priority based on configuration information. The storage system 100 may be a storage server system including physical storage space mapped to storage units, such as virtual volumes, accessible to a host. A host may transact with the physical storage system through the virtual volume storage system. A user may communicate with the storage system 100 to provide configuration information about how to utilize the storage units. For example, an administrator may provide user input to a user interface to indicate which host to export a storage unit to. The storage system 100 includes storage units 103, a processor 101, and a machine-readable storage medium 102.

The processor 101 may be a central processing unit (CPU) semiconductor-based microprocessor, or any other data controller device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

Storage units 103 include storage units controlled by processor 101. The storage units 103 may be virtual volumes associated with underlying physical storage space. The storage units 103 may have identifiers, such as logical unit numbers, used by hosts to communicate with the storage units 103. For example, each of storage units 1, 2, and 3 may have a unique identifier. A host may view a storage unit as one of the identifiers connected to a port.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include configuration information standardization instructions 104, storage unit priority value determination instructions 105, and priority order list creation instructions 106.

The configuration information standardization instructions 104 include instructions to standardize configuration information associated with storage units 103 by taking into account the relative relationship of the configurations of storage units. For example, the fact that a storage unit is marked as having a high i/o bandwidth is more significant if this setting is much greater than the settings for the majority of the other storage units, as opposed to if the higher i/o bandwidth for the storage unit is the same as the i/o bandwidth for half of the storage units.

The configuration information may be any suitable configuration information. The configuration information may be predefined configuration information that a user has provided to the storage system 100 for the purpose of indicating how the storage units 103 within the storage system 100 are used. In one implementation, the configuration information is host exportation information and quality of service information. For example, the export information may include information about whether and to how many hosts a storage unit is exported. (Exporting a storage unit to a host enables the host to communicate with the storage system with respect to the storage unit.) The quality of service information may include any quality of service information that the storage system allows to be set for storage units and/or groups of storage units. For example, the quality of service information may include settings related to priority, i/o limit, i/o guarantee, bandwidth limit, bandwidth guarantee, and target latency.

In one implementation, a user interface is provided to allow for the user input of configuration information used to derive priority. In one implementation, the processor determines which subset of configuration information to utilize for determining priority based on factors such as the implementation action being performed.

The storage unit priority value determination instructions 105 include instructions to determine priority values associated with each of the storage units 103 based on the standardized configuration information. Each storage unit may be assigned a specific priority value that can be positionally sorted with respect to other storage units. For example, the priority information for storage unit 1 may be a value of 2.5 and/or a position 3.

In one implementation, a storage unit group affiliation is further taken into account. For example, a user may group storage units for data related to common applications or storage units may be grouped based on host affiliation. Storage units within the same group may be positioned near one another in the priority list. Treating storage units in the same group with similar priority may result in a particular application or host being available sooner. The priority information may be determined for the group as a whole, such as by aggregating the configuration information for storage units within the group and giving the group members the same priority value. In one implementation, a group is positioned in a priority list, and the group member storage members are associated with the group position.

The priority order list creation instructions 106 includes instructions to create a priority order list based on the relative value of the priority values. The processor 101 may perform an action related to the storage units 103 according the priority order list. For example, the priority order may be used to determine an order to recover the storage units in the event of a failure occurrence. In cases where many storage units are to be recovered, using the priority information to recover the storage units lessens the time for which more important data is inaccessible to a user.

Figure 2:
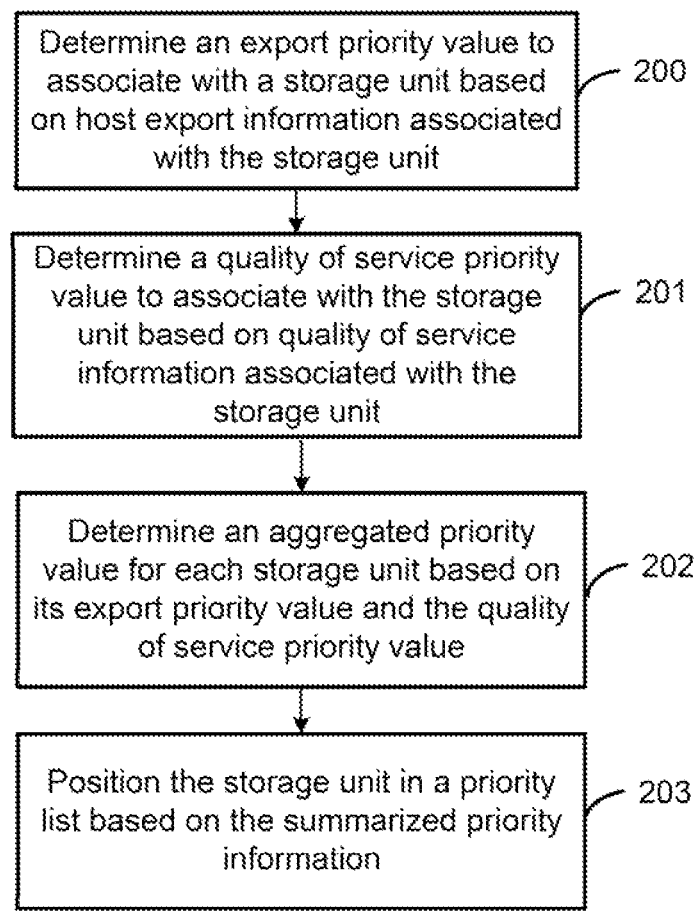
FIG. 2 is a flow chart illustrating one example of a method to determine storage unit priority based on configuration information.

FIG. 2 is a flow chart illustrating one example of a method to determine storage unit priority based on configuration information. The method may be implemented, for example, by the storage system 100 of FIG. 1. The configuration information may be information input by a user into a user interface indicating how a storage unit is to be used, such as quality of service information and host export information. The configuration information used may be the configuration settings extant at the time an action is to be taken, such as when a node fails and storage unit recovery is to take place. In one implementation, a priority list is created periodically to account for updated configuration parameters. In one implementation, additional information is used to determine the priority. For example, the configuration information and information about how the storage unit was previously used may be used. The usage information may include information, such as the amount of data transferred to the storage unit.

Beginning at 200, a processor determines an export priority value to associate with a storage unit based on host export information associated with the storage unit. For example, the export priority value may be related to whether a storage unit is exported, and/or to how many hosts or host adapters the storage unit is exported. A higher priority may be inferred for a storage unit that is exported compared to one that is not, and a higher priority may be inferred for a storage unit that is exported to more hosts or host adapters than another storage unit. In one implementation, the export information is divided into two separate values, one for whether the storage unit is exported and a second value related to how many hosts or host adapters to which it is exported. In one implementation, the processor standardizes the export information, such as based on how much being exported deviates from the mean and how much the particular number of exports deviates from the mean. In one implementation, the export parameter values are used without standardization.

Continuing to 201, a processor determines a quality of service priority value to associate with the storage unit based on quality of service information associated with the storage unit. The quality of service information may be information that the storage system allows an administrator to set to configure the storage units. The quality of service information may be set for individual storage units, a system-wide default value, and/or for groups of storage units.

In some cases, the quality of service information may be set for some storage units and not for others. For example, parameter A may be set for storage unit 1 and not for storage unit 2, and parameter B may be set for set for storage unit 2 and not for storage unit 1. In one implementation, the processor may assign a quality of service parameter to a storage unit for the purpose of determining the recovery order where the quality of service parameter is not set for the particular storage unit. For example, the processor may assign the storage unit the value associated with a group including the storage unit or a system default value for a parameter without a value associated with the storage unit itself. The processor may assign the storage unit a calculated default value, such as the mean or other value indicating a default value where a default value is not explicitly provided for the system or group.

In one implementation, instead of or in addition to directly comparing the parameters assigned to storage units, standardized values of the parameters are assigned and compared, thus making it possible to compare different types of parameters when all types of parameters haven't been set for all storage units.

When multiple parameters are assigned to a given storage unit, the maximum of the standardized parameters may be assigned to the storage unit for the purpose of comparison.

In one implementation, the processor standardizes the quality of service parameters such that a quality of service value of a first parameter may be compared to a quality of service value of a second parameter. For example, the mean for a parameter may be determined by the sum of the values for a particular parameter across the storage units divided by the number of storage units where mean for parameter x is determined by:

$$\mu = (\Sigma x_1)/N,$$

where N is the number of storage units and x is the value of parameter x storage unit i.

The processor may determine a mean absolute deviation to indicate the variability of the parameter values from the mean. For example, the mean absolute deviation may be determined by:

$$\sigma = \Sigma |x_i - \mu| / N$$

The processor may determine a priority parameter value to associate with a storage unit based on the parameter value for the storage unit, the mean, and the mean absolute deviation by:

$$\text{priority parameter value} = (x_i - \mu) / \sigma$$

The priority parameter value may be used to compare configuration information of different storage units.

Any suitable summary statistical method may be used to compare a parameter value of a storage unit to parameter values of other storage units. For example, the median may be used in addition to or instead of the mean. In one implementation, a processor determines the mean of a parameter value and its standard deviation from the mean. The mean and standard deviation may be updated at a regular interval and/or when new information is received.

FIG. 3 is a block diagram illustrating one example of standardizing a configuration parameter to indicate the relative value of the parameter within a storage system. Block 300 shows the value of a configuration parameter A of storage unit 1, and the system mean and standard deviation of the parameter. For example, the parameter A value for storage unit 1 is 2, and the storage system mean for all of the storage units in the example is 5.

Block 301 shows determining a value for the parameter for the purpose of determining priority by standardizing the parameter A value. For example, the value may be standardized by determining the difference of the value from the mean and dividing by the mean absolute deviation. Block 302 shows the standardized values for storage units 1-4, with storage unit 1 having the value −1.5 determined in block 301. The parameter values of the other storage units may also be standardized, and the standardized values may be compared to determine a priority order. Block 303 shows a priority order determined based on the standardize values of configuration parameter A. For example, storage unit 1 is recovered fourth in the list because of the relative value of its standardized value of configuration parameter A.

Figure 4:
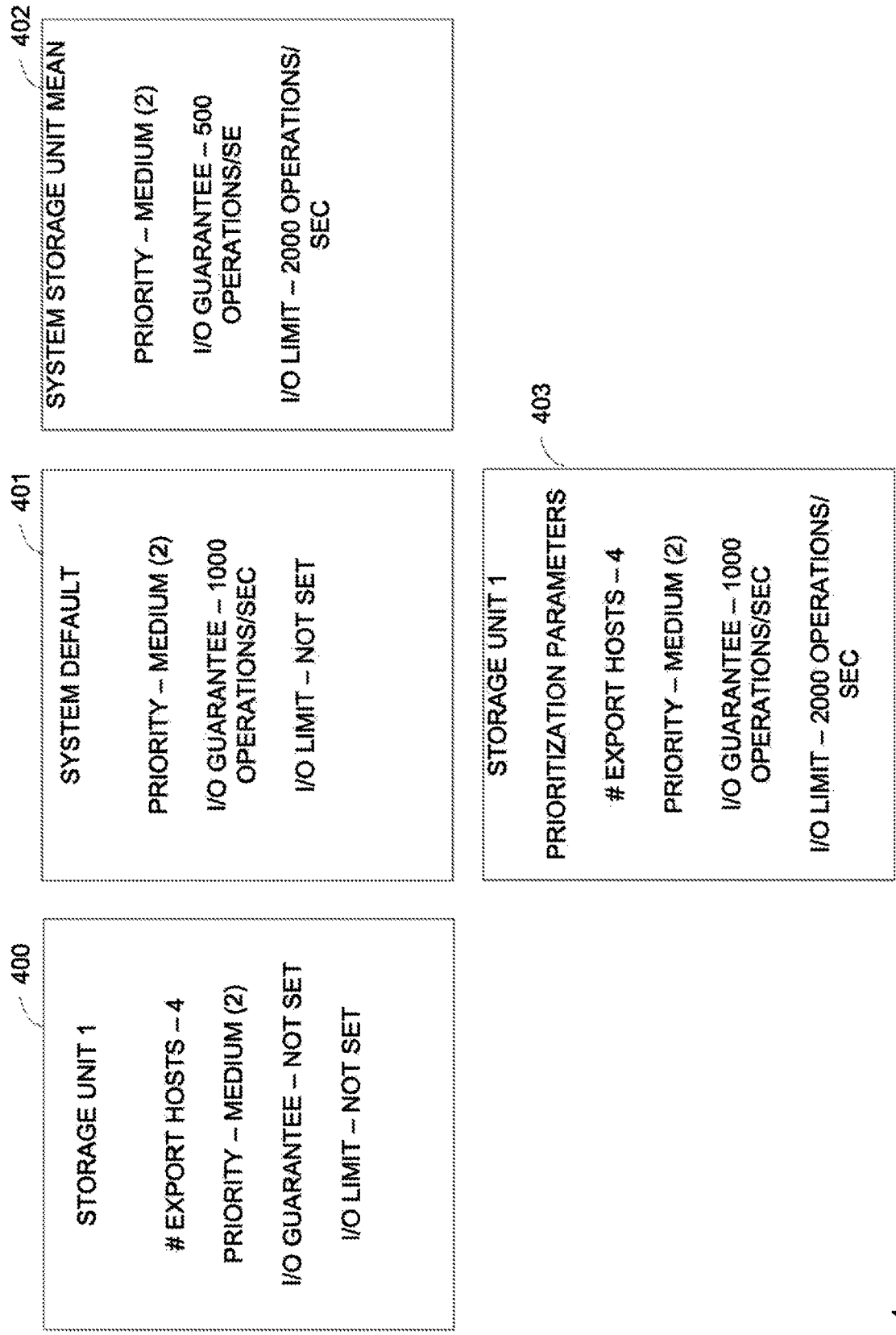
FIG. 4 is a block diagram illustrating one example of selecting configuration parameters to use to determine storage unit priority.

FIG. 4 is a block diagram illustrating one example of selecting configuration parameters to use to determine storage unit priority. For example, in some cases, configuration parameters may be optional such that they are set for some storage units and not for others. A processor may select parameters to use for comparison to determine priority such that storage units may be compared despite different parameters being set for the different storage units.

Block 400 shows configuration information for storage unit 1. There are 4 configuration parameters, and 2 of them are set for storage unit 1. Block 401 shows system defaults for configuration parameters. For example, in some cases, an administrator may set a system default to be used in cases where a parameter is not set for a storage unit. System defaults are set for 2 of the parameters. Block 402 shows system means for each of the parameters. Block 403 shows the parameters selected for storage unit 1 for determining the priority. For example, the priority of the storage unit 1 is set so the set value is used. The i/o guarantee parameter is set as a system default but not for storage unit 1. As a result, the system default is used for the i/o guarantee parameter. The i/o limit parameter is not set for either storage unit 1 or the system default. The processor may use the system mean, in effect cancelling out the effect of the parameter for the recover order for storage unit 1. The selected values may then be standardized and used to determine a priority position for storage unit 1.

Referring back to FIG. 2 and continuing to 202, a processor determines an aggregated priority value for each storage unit based on its export priority value and its quality of service priority value. For example, in one implementation a value for whether or not the storage unit is exported may be weighted with highest importance, with the quality of service information weighted next highest, and the number of exports weighted lowest. In one implementation, the quality of service information is a standardized priority summarized by the average value or the maximum value of the set of standardized quality of service parameters associated with a storage unit. The summary value may then allow for a single value to be compared where different storage units have different configuration parameters set.

In one implementation, a priority value associated with a storage unit is represented by a field where a first bit indicates whether the storage unit is exported, a second bit or set of bits indicates a priority associated with different quality of service parameters, and a third bit or set of bits indicates a degree of exportation, such as the number of host exports. A number represented by the field of bits may be associated with each storage unit, and the storage units' numbers may be compared to determine priority. For example, the exported storage units may have the highest priority with the priority among these exported storage units determined by the next set of bits related to configuration information. In one implementation, a limited number of bits is used for priority comparison, and an operation is performed on information related to the configuration to reduce the number of bits to fit within the bit limit. For example, the log base 2 of the number of exports may be used in cases where the number of exports for some storage units may be greater than the number of bit positions allocated to the export information.

In one implementation, when a storage unit has more than one standardized parameter assigned, this set of values may be replaced by a single priority value, using the average, median, maximum, or minimum value of the set of standardized parameters. This single summary value may then be used to represent the set of parameters as a whole for the storage unit.

In one implementation, a user may configure storage units to be grouped together. For example, storage units associated with the same application may be considered to be grouped together. In one implementation, the storage units are grouped based on their affiliation with other storage units. For example, there may be a base storage unit with snapshot storage units affiliated with it, where each snapshot represents the base storage unit at a point in time. The prioritization may be performed in a manner that results in snapshot volumes and the related base volume being treated as a group.

The processor may position a storage unit in the priority list according to the position of a group of storage units to which the storage unit belongs. The same group priority value may be assigned to each of the group's constituent storage units. For example, the priority values of the constituent storage units may be summarized, such as by averaging the values, or using their maximum or minimum.

The summarized group priority value may be used to determine the priority for each of the storage units within the group.

Continuing to 203, a processor positions the storage unit in a priority list based on the summarized priority information. The processor may analyze a set of storage units in a storage system in any suitable order to determine their relative priority order based on configuration information. Any suitable data structure may be used. In one implementation, the processor creates an array of the storage units within the storage system where each row in the array corresponds to a storage unit with a constituent entry indicating a priority value associated with the storage unit. The processor may sort the array according to the priority values, and then traverse the array to create a list of the storage units in a priority order. In some cases, a storage unit may be represented within the array multiple times due to multiple group affiliations and snapshots of the storage unit. Duplicates may be removed from the array, such as by taking the highest priority value and/or position associated with the storage unit.

As an example, the processor may sort an array of priority values. The list may have the highest value as having the highest priority or vice versa. In order to create a final list of storage units sorted by priority, storage units may first be placed in a list in any order, and may be represented more than once in the list, by the storage unit itself, and by its membership in one or more storage unit groups, which may also be placed in the list, all of which are assigned a priority value. The list may then be sorted by the priority value assigned to each storage unit and storage unit group. The list may then be traversed in priority in order to generate a final storage unit priority list, for which individual storage units represent themselves, and storage unit groups represent the ordered placement of all constituent storage units as a batch. If a given storage unit is thus represented more than once in this traversal, the first instance traversed is used, and the subsequent duplicate instances are ignored.

The processor may output the priority list, such as by storing or transmitting it. In one implementation, the processor performs an action based on the priority list. For example, the processor may recover storage units in an order based on the prioritization list. Using the priority list may result in a better user experience without adding a burden to a user to provide additional information.

The invention claimed is:

1. A storage system, comprising:
a processor; and
a non-transitory machine readable medium storing instructions that are executable by the processor to cause the processor to:
determine that configuration information associated with one storage unit of a set of storage units is not set, wherein the set of storage units comprises the one storage unit and other storage units;
set the configuration information associated with the one storage unit by assigning a mean value of the configuration information associated with the other storage units to the configuration information associated with the one storage unit;
analyze the configuration information associated with the set of storage units to create a priority order associated with the set of storage units; and
perform an action related to the set of storage units according to the priority order, the action comprising any of:
recovering failed storage units of the set of storage units in an order based on the priority order;
presenting storage units of the set of storage units to hosts in an order based on the priority order; and
in rebalancing the set of storage units, selecting which storage units to move to a new node based on the priority order.

2. The storage system of claim 1, wherein the instructions are further to cause the processor to prioritize the storage units according to a grouping of storage units.

3. The storage system of claim 2, wherein the grouping comprises at least one of: a grouping based on application and a grouping based on host exportation.

4. The storage system of claim 1, wherein the configuration information comprises at least one of: export information and quality of service information.

5. The storage system of claim 4, wherein the instructions are further to cause the processor to:
analyze storage unit usage information and
use the storage unit usage information to create the priority order.

6. The storage system of claim 4, wherein the instructions are further to cause the processor to:
determine, for each storage unit of the set of storage units, a standardized configuration value for the respective storage unit by adjusting a value of the configuration information associated with the respective storage unit based on summary information derived from the configuration information of the set of storage units;
determine, for each storage unit of the set of storage units, a priority value for the respective storage unit based on the standardized configuration value of the respective storage unit, and
position the set of storage units in the priority order based on their respective priority values.

7. A method, comprising:
determining an export priority value to associate with one storage unit of a set of storage units based on host export information associated with the one storage unit;
standardizing quality of service information associated with the one storage unit by adjusting at least one quality of service parameter associated with the one storage unit based on quality of service summary information derived from the set of storage units;
determining a quality of service priority value to associate with the one storage unit based on the standardized quality of service information associated with the one storage unit;
determining an aggregated priority value for the one storage unit based on the export priority value and the quality of service priority value; and
positioning the storage unit in a priority list based on the aggregated priority value.

8. The method of claim 7, further comprising, in response to the one storage unit not having a value set for a given quality of service parameter, setting the value of the given quality of service parameter for the one storage unit based on a summary value derived from quality of service information associated with other storage units of the set of storage units.

9. The method of claim 7, wherein the export priority value comprises a first value associated with whether the one storage unit is exported and a second value associated with at least one of how many hosts and host adapters the one storage unit is exported to.

10. The method of claim 7, further comprising:
    determining a group aggregated priority value for a grouping that includes the one storage unit based on the aggregated priority value of the one storage unit;
    wherein positioning the one storage unit in the priority list based on the aggregated priority value comprises positioning the one storage unit according to the group aggregated priority value.

11. The method of claim 7, further comprising, in response to the one storage unit not having a value set for a given quality of service parameter, setting a system default as the value of the given quality of service parameter for the one storage unit.

12. The method of claim 7,
    wherein the priority list is a recovery priority list that indicates an order in which the plurality of storage units are to be recovered during a recovery operation.

13. A non-transitory machine-readable storage medium comprising instructions executable by a processor to:
    determine, for each storage unit of a plurality of storage units, at least one standardized quality of service value for the respective storage unit by adjusting a value of a quality of service parameter associated with the respective storage unit based on quality of service summary information derived from the plurality of storage units;
    determine, for each storage unit of the plurality of storage units, a quality of service priority value for the respective storage unit based on the at least one standardized quality of service value of the respective storage unit; and
    position the plurality of storage units in a priority list based on their respective quality of service priority values.

14. The non-transitory machine-readable storage medium of claim 13, further comprising instructions to:
    associate each storage unit of the plurality of storage units with a grouping of at least one groupings;
    determine, for each of the at least one groupings, a group aggregated priority value based on the quality of service priority values of the storage units associated with the respective grouping; and
    wherein the instructions to position the plurality of storage units in the priority list based on their respective quality of service priority values comprise instructions to position the plurality of storage units according to the group aggregated priority values.

15. The non-transitory machine-readable storage medium of claim 13,
    wherein, for each storage unit of a plurality of storage units, the at least one standardized quality of service value is determined for the respective storage unit by:
        determining a difference between a value of a quality of service parameter associated with the respective storage unit and a summary value of the quality of service parameter derived from the plurality of storage units and
        dividing the difference by a variability value that indicates a variability of values of the quality of service parameter among the plurality of storage units.

16. The non-transitory machine-readable storage medium of claim 13,
    wherein the priority list is a recovery priority list that indicates an order in which the plurality of storage units are to be recovered during a recovery operation.

17. The non-transitory machine-readable storage medium of claim 13,
    wherein, for each storage unit of the plurality of storage units, the quality of service priority value of the respective storage unit is a summary value of the at least one standardized quality of service value of the respective storage unit.

18. The non-transitory machine-readable storage medium of claim 13, further comprising instructions to:
    determine, for each storage unit of the plurality of storage units, an export priority value for the respective storage unit based on host export information associated with the respective storage unit; and
    determine, for each storage unit of the plurality of storage units, an aggregate priority value for the respective storage unit based on the export priority value of the respective storage unit and the quality of service priority value of the respective storage unit,
    wherein the instructions to position the plurality of storage units in the priority list based on their respective quality of service priority values include instructions to position the plurality of storage units in the recovery priority list based on their respective aggregate priority values.

19. The non-transitory machine-readable storage medium of claim 13, further comprising instructions to:
    for each storage unit of the plurality of storage units, if the respective storage unit does not have a value set for a given quality of service parameter, set the value of the given quality of service parameter for the respective storage unit based on a summary value derived from quality of service information associated with other storage units of the plurality of storage units.

20. The non-transitory machine-readable storage medium of claim 13, further comprising instructions to:
    for each storage unit of the plurality of storage units, if the respective storage unit does not have a value set for a given quality of service parameter, set the value of the given quality of service parameter for the respective storage unit to a specified default value.

* * * * *